United States Patent [19]

Fitzsimons et al.

[11] 3,746,795

[45] July 17, 1973

[54] LONG LINE ADAPTER CIRCUIT USABLE WITH INCREASED POWER SUPPLY

[75] Inventors: Alan R. Fitzsimons, Laguna Beach; Frank P. Mazac, Santa Ana, both of Calif.

[73] Assignee: San/Bar Electronics Corp., Santa Ana, Calif.

[22] Filed: Nov. 2, 1970

[21] Appl. No.: 86,039

[52] U.S. Cl. .................................................. 179/16 F

[51] Int. Cl. .................................................. H04q 1/30

[58] Field of Search ..................... 179/16 E, 16 EA, 179/16 F, 18 HB, 18 F, 18 FA

[56] References Cited

UNITED STATES PATENTS

| | | | |
|---|---|---|---|
| 3,660,609 | 5/1972 | Tremblay et al. | 179/16 F |
| 3,626,101 | 12/1971 | Fitzsimons et al. | 179/16 F |
| 3,689,700 | 9/1972 | Lent | 179/16 F |
| 1,719,499 | 7/1929 | Bowne | 179/16 E |
| 2,954,438 | 9/1960 | Bray et al. | 179/18 F |
| 3,166,642 | 1/1965 | Abott | 179/84 |
| 3,247,327 | 4/1966 | Lanham | 179/16 E |
| 3,339,027 | 8/1967 | Feiner et al. | 179/16 F |
| 3,508,009 | 4/1970 | Henry et al. | 179/16 F |

*Primary Examiner*—Kathleen H. Claffy
*Assistant Examiner*—Randall P. Myers
*Attorney*—Jackson & Jones

[57] ABSTRACT

An improved long line adapter circuit designed to provide ringing supervision, pulse repetition and adequate transmission current for abnormally long subscriber loops and which may be used either at a central office or at a midplacement point to couple a subscriber facility to the central office, is disclosed. Included in the long line adapter circuit is a subscriber circuit and a central office circuit. A line coupling transformer is employed to provide audio coupling between the central office and subscriber circuits. A solid-state pulsing circuit is included in the subscriber circuit to respond to dialing at a subscriber subset and to a receiver thereof being placed in an off-hook condition. The adapter circuit is designed to be used with external power supplies providing either the standard 48 volts for normally distant subscriber loops or to provide a total of 96 volts for very long subscriber loops. A voltage converter or booster circuit and an off-hook sensing circuit may be included in the adapter circuit for the purpose of internally developing the additional + 48 volts for very long subscriber loops while employing the normal negative 48 volt external power supply.

10 Claims, 4 Drawing Figures

INVENTORS.
ALAN R. FITZSIMONS
BY FRANK P. MAZAC
Jackson & Jones
ATTORNEYS.

INVENTORS.
ALAN R. FITZSIMONS
BY FRANK P. MAZAC
Jackson & Jones
ATTORNEYS.

INVENTORS.
ALAN R. FITZSIMONS
BY FRANK P. MAZAC
Jackson & Jones
ATTORNEYS.

LONG LINE ADAPTER CIRCUIT USABLE WITH INCREASED POWER SUPPLY

BACKGROUND OF THE INVENTION

1. Field of the Invention

This invention generally relates to circuitry for extending the effective range of telephone lines. More particularly, the present invention concerns an improved long line adapter circuit that allows telephone service of undiminished quality to be provided to subscriber facilities situated abnormally distant from a central office.

2. Description of the Prior Art

Due to the progress that has been made in the telephone industry, the transmission of voice intelligence over long distance telephone lines no longer presents a difficult problem. However, the provision of service to subscriber facilities is still hampered by the degradation of "signaling" (dialing, supervisory control, etc.) caused by the attendant excessive resistance of "long lines."

Conventionally, telephone equipment is designed to operate at, and tolerate, resistances of up to 1,200 ohms. The quality of "signaling" is progressively degraded, by attenuation and distortion, as a result of resistances exceeding this 1,200 ohms. Such degradation results in, for example, misdialing. The amount of resistance imposed by a line is generally directly proportional to the length of the line. Accordingly, the more distant a subscriber facility, such as a telephone subset, is from a central office, the greater the line resistance will be.

Many techniques have been employed in the prior art for the purpose of correcting or compensating for the degenerative effects of abnormally long lines. As an example, lines having a greater diameter, or a lower gauge, have been used to reduce the resistance per unit length imposed by the line. However, the use of such lower gauge telephone lines has the disadvantage of bulk in that where standard multi-line telephone cables are used, a smaller number of lower gauge lines may be included in a standard size cable. Consequently, greater numbers of multiline cables would be required to provide service to a given number of subscribers where high population density urban areas are involved. As a result, underground conduit capacities may become filled and provide a limiting factor. The use of such lower gauge lines would thus be impractical.

Various alternatives to varying the gauge of telephone lines have been designed One of these alternatives is a recently developed long line adapter circuit that successfully accommodates all of the ordinary telephone signaling functions, i.e., dialing, supervisory control, etc., by utilizing a combination of relay controlled contacts. This recently developed adapted circuit is described in detail in copending U.S. patent application Ser. No. 42,190, filed on June 1, 1970, which is owned by the assignee of the present invention.

The use of such relays has been found to be suitable as long as consumer telephone companies are employing the standard 48 volt power supplies. However, in many instances, the consumer of long line adapter circuits, i.e., telephone companies, desires to employ 96 volts for very long subscriber loops instead of the ordinary 48 volts used for shorter subscriber loops. When such additional voltages are used, it has been found that the ordinary relays are not suitable for use.

Typically, the 96 volts would be externally provided by telephone company power sources, such as batteries. This would generally require that a pair of the typically available 48 volt batteries be serially connected. To avoid the doubled power supply requirement, consumer telephone companies may desire that the additional voltage be internally developed by the long line adapter circuit itself, while continuing to use only the ordinary 48 volt power supplies.

Accordingly, it is the intention of the present invention to provide a versatile long line adapter circuit that may be used with the standard negative 48 volt power supply or with an additional positive 48 volt power supply to provide a total of 96 volts to the subscriber loop. Additionally, the unit may be easily modified to internally develop the additional 48 volts to provide a desired 96 volts to the subscriber loop while using a standard negative 48 volt power supply.

SUMMARY OF THE INVENTION

Briefly described, the present invention involves a long line adapter circuit that serves to extend the effective range of signals over telephone lines and which is capable of being adapted to provide either high or low voltage operation, the high voltages being either externally provided or internally developed.

More particularly, the subject long line adapter circuit is employable with telephone lines that connect a central office to either short or long distance subscriber facilities. The adapter circuit essentially includes a central office circuit and a subscriber circuit which are operatively coupled through a line coupling transformer. A solid-state pulsing circuit, connected in the subscriber circuit, responds to dialing and to a receiver in an off-hook condition. Long loop or short loop operation is accommodated by the simple expedient of modifying the positions of a number of connector elements to utilize either a high voltage or low voltage power source, respectively, when available. When high voltage sources are unavailable, D.C. to D.C. voltage changing circuit, which responds to an off-hook sensing circuit, operates to internally develop the desired high operating voltage using the standard low voltage power supply.

The objects and many attendent advantages of the invention will be more readily appreciated as the same becomes better understood by reference to the following detailed description which is to be considered in connection with the accompanying drawings wherein like reference symbols designate like parts throughout the figures thereof.

DESCRIPTION OF THE PREFERRED EMBODIMENT

Figure 1:
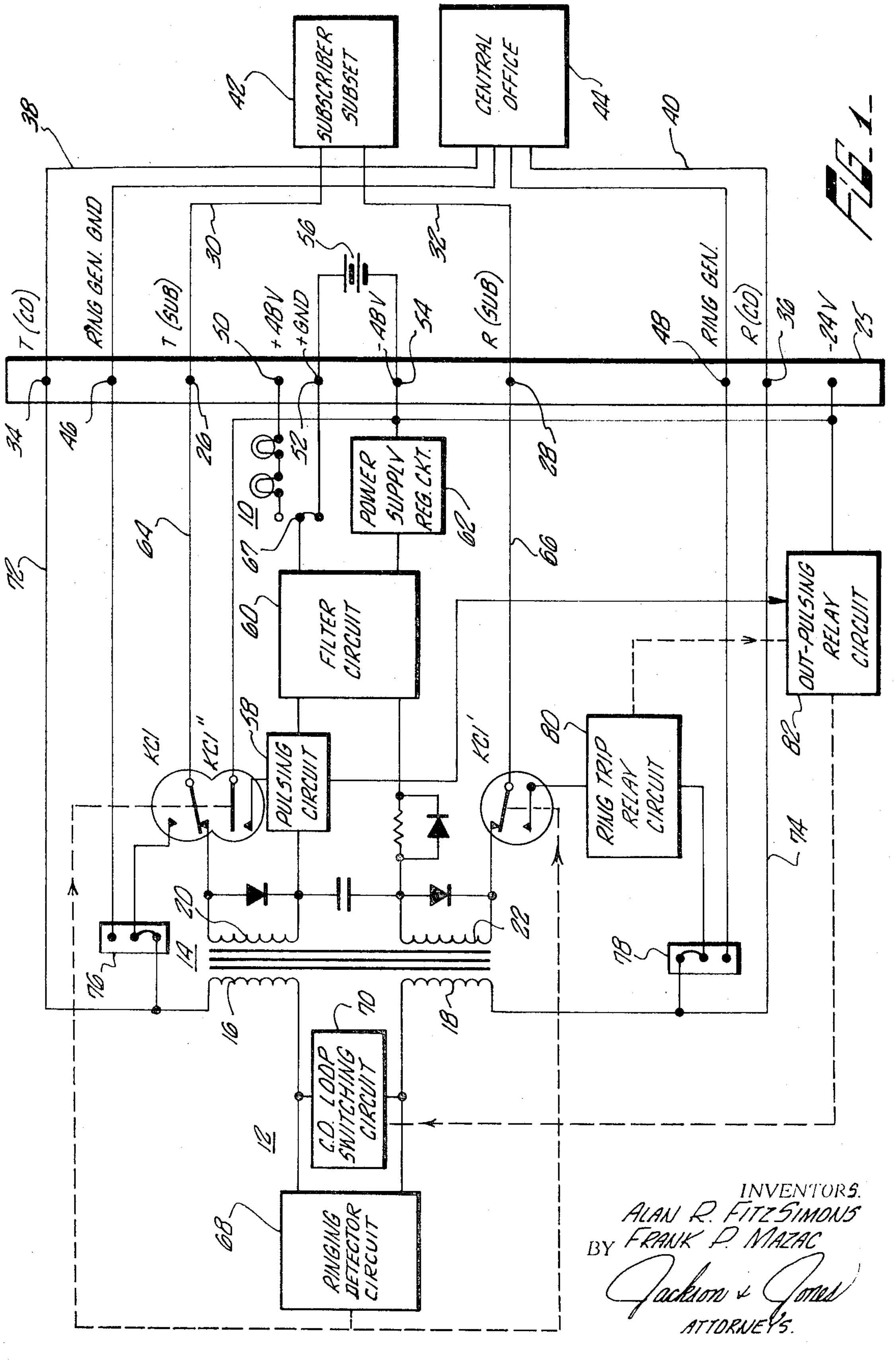
FIG. 1 is a general schematic block diagram illustrating an embodiment of the present invention.

Referring to the drawings, a long line adapter circuit, as shown in FIG. 1, is generally formed by a subscriber circuit 10 and a central office circuit 12 which are inductively coupled by a transformer 14 having a pair of primary coils 16 and 18 and an associated pair of secondary coils 20 and 22. The subscriber circuit 10 and the central office circuit 12 are respectively coupled to a subscriber subset and to a central office through a terminal board 25. As shown, the terminal board 25 includes a subscriber tip terminal 26 and a subscriber ring terminal 28 which allow the subscriber loop circuit 10 to be connected to the conventional tip line 30 and ring line 32 of a subscriber loop. A central office tip terminal 34 and a central office ring terminal 36 are also provided for connecting the central office circuit 12 to the conventional tip line 38 and ring line 40 of a central office loop. A subscriber facility or subset 42 may be coupled to a central office facility 44 through a long line adapter circuit, by being coupled to the terminal board 25. The terminal board 25 is also provided with repeated or reconstituted ringing terminals 46 and 48 which enable reconstituted ringing current to be provided to a subscriber subset 42 from the central office 44. A trio of power terminals 50, 52 and 54 are provided for connecting an external power supply, such as battery 56 or the like, to the subscriber circuit 10.

The subscriber circuit 10 essentially includes a pulsing circuit 58, a high pass filter circuit 60 and a power supply regulator circuit 62. Starting at the subscriber tip terminal 26, the tip side of the subscriber circuit 10 may be traced along a tip lead 64, through a relay contact KC1 (shown in a normal position), the secondary coil 20, the pulsing circuit 58, the high pass filter circuit 60 and to a terminal 66 which is adapted to be coupled to either of the alternate positive power supply terminals 50 and 52. The ring side of the subscriber circuit 10 may be traced from the negative power supply terminal 54, through the regulator circuit 62, the filter circuit 60, the secondary coil 22, a relay contact KC1′ (shown in a normal position), a ring lead 66 and to the subscriber ring terminal 28. A subscriber loop is completed through the adapter circuit by having the subscriber tip and ring lines 30 and 32 respectively coupled to the terminals 26 and 28 on the terminal board 24.

Briefly, the pulsing circuit 58 responds to a receiver of the subset 42 being placed in an off-hook condition and to dialing pulses generated at the subscriber subset 42. The pulsing circuit 58 includes a safety circuit that is controlled by the relay contact KC1″ (shown in normal position). The safety circuit, which is discussed hereinafter in greater detail, serves to prevent operation of the pulsing circuit 58 during a ringing period when the subset 42 belongs to a party being called. This safety circuit prevents false ring trip as may result from the operation of the pulsing circuit 58 by the discharge of any electrical charge that is present due to line capacitance.

The high pass filter 60 serves to attenuate battery noise caused by voltage surges generated by the operation of the pulsing circuit 58.

The power supply regulator circuit 62 operates to prevent saturation of the transformer 14 and to provide current limiting when the adapter circuit is used with a short subscriber loop.

The central office (CO) circuit 12 includes a ringing detector circuit 68 and a switching circuit 70 which is connected in parallel with the ringing detector circuit 68. The CO circuit 12 may be traced from the CO tip terminal 34, through a CO tip lead 72, the primary coil 16, the switching circuit 70, the primary coil 18, a CO ring lead 74 and to the CO ring terminal 36. A central office loop is completed through the adapter circuit by the CO tip and ring lines 38 and 40 being respectively connected to the CO tip and ring terminals 34 and 36 and the terminal board 25.

Generally, the ringing detector circuit 68 serves to sense the presence of ringing current being applied from the central office 44 as would occur when the subset 42 belongs to a party being called. Conventionally, this ringing current signal is primarily an alternating current of a predetermined frequency combined with a nominal background direct current.

The switching circuit 70 serves to controllably close or open the CO circuit 12 such that when the switching circuit 70 is closed, the ringing detector circuit 68 is shunted and the central office loop is completed through the adapter circuit.

The operation of the present invention is now briefly considered to provide a better understanding thereof. Assuming that the subset 42 belongs to a party being called, a ringing current would be applied from the central office 44 over the CO lines 38 and 40, to the CO tip and ring leads 72 and 74 of the CO circuit 12 to the ringing detector circuit 68. This ringing current would be sensed by the ringing detector circuit 68 and the relay contacts KC1, KC1′ and KC1″ would be operated to reverse their positions. The ringing current would then be applied to the subscriber subset 42 through a patchboard 76, the relay contact KC1, the subscriber tip lead 64, and the subscriber tip line 30, on the tip side, and through a patchboard 78, a ring trip relay circuit 80, the relay contact KC1′, the subscriber ring lead 66, and the subscriber ring line 32 on the ring side. Application of such ringing current to the subscriber subset 42 will cause the customary bell included therein to be operated. Upon the receiver of the subscriber subset 42 being lifted off the hook, i.e., the telephone being answered, the subscriber loop will be closed (the subscriber loop is ordinarily open when the receiver is on the hook). The pulsing circuit 58 or the ring trip relay circuit 80 will then respond to the direct current applied thereto, in a manner to be hereinafter discussed in greater detail, and trigger an out-pulsing relay circuit 82. This triggering of the out-pulsing relay circuit 82 will affect closure of the switching circuit 70 which serves to shunt the ringing detector circuit 68. The relay contacts KC1, KC1′ and KC1″ are as a result permitted to revert to their normal positions (as shown). The customary transmission of audio intelligence is then allowed to take place between the subscriber subset 42 and the central office 44 through the long line adapter circuit.

When the subscriber subset 42 belongs to a calling party, the receiver is first lifted off the hook to be thereby converted to an off-hook condition. The subscriber loop being closed by the receiver off-hook condition, direct current is applied to the pulsing circuit 58 from the battery 56. Operation of the pulsing circuit 58 again results in the switching circuit 70 being closed by the triggering of the out-pulsing relay circuit 82. The central office loop is thus closed and the conventional line seizure at the central office 44 will occur. Subsequent dialing at the subscriber subset 42 will cause the subscriber loop to be periodically opened and closed in the conventional manner. The resulting pulses of direct current that are applied to the pulsing circuit 58 produce a pulsed operation thereof which in turn causes the switching circuit 70 to be opened and closed. Dialing signals are thereby transmitted to the central office 44 in the form of pulses corresponding to the opening and closing of the CO loop circuit 12.

Figure 2:
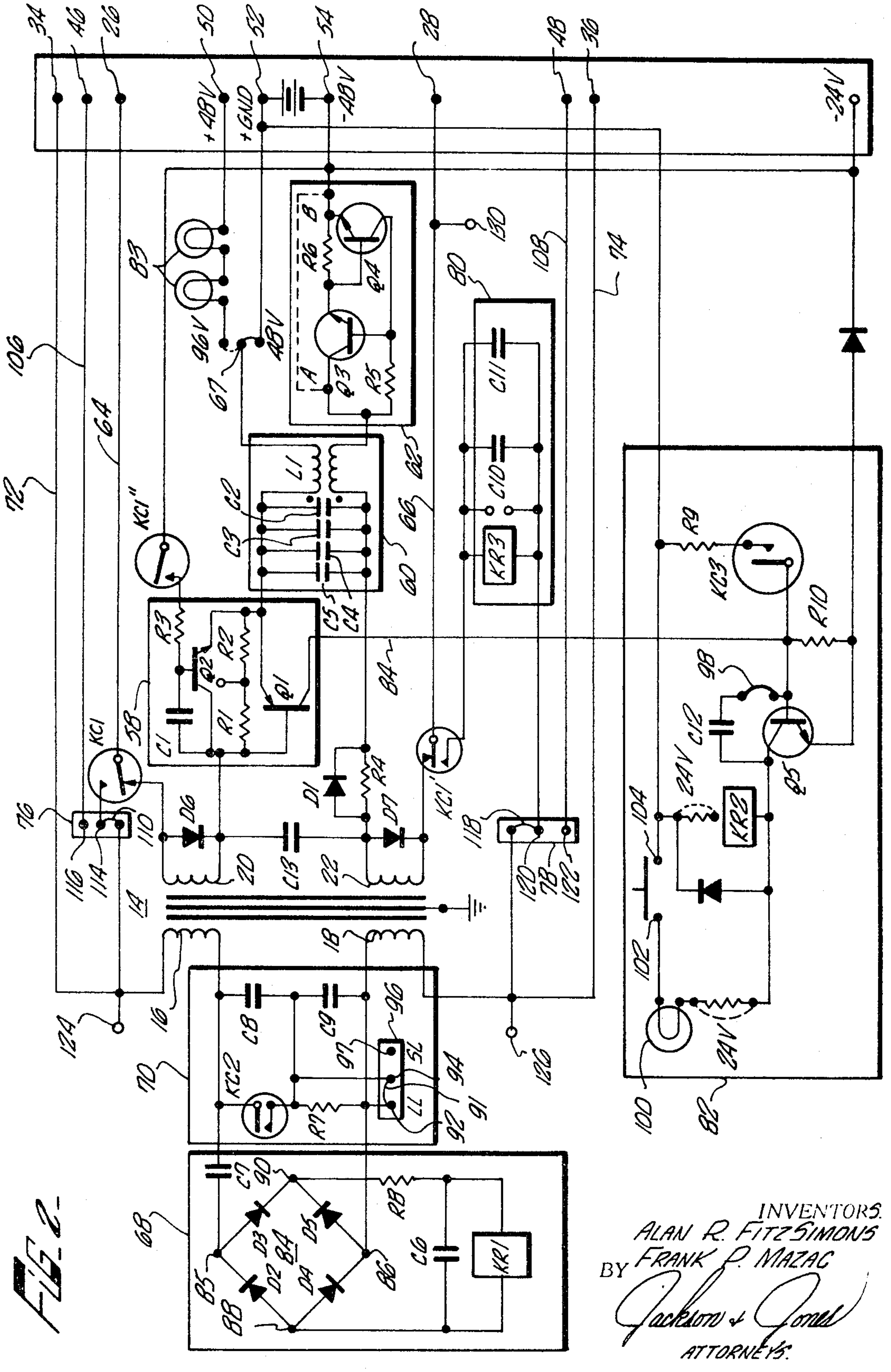
FIG. 2 is a detailed schematic circuit diagram of the embodiment shown in FIG. 1.

Referring now to FIG. 2 which illustrates the embodiment of FIG. 1 in greater detail, the pulsing circuit 58 includes a PNP transistor Q1 having the base and emitter leads thereof coupled to the secondary coil 20 and the filter 60, respectively. A pair of biasing resistors R1 and R2 are coupled between the base and emitter leads such that application of current from the power supply renders the transistor Q1 conductive. A triggering signal is accordingly applied over a collector lead 84 to the out-pulsing relay circuit 82.

As shown, a safety circuit is provided by an NPN transistor Q2 having the collector and emitter leads thereof coupled to shunt the pulsing transistor Q1. A capacitor C1, coupled between the collector and base of the transistor Q2, operating in conjunction with a resistor R3 that is coupled between the base of transistor Q2 and the relay contact KC1'', serves as a timing circuit. The safety circuit formed by the transistor Q2 which is operative only when contact KC1'' is closed during the application of ringing current to the subset 42, serves to shunt circuit transistor Q1 and thereby delay the time at which the pulsing transistor Q1 is rendered conductive. This delay is designed to be long enough to allow any charge stored in the lines and steming from the pulses of ringing current to be dissipated. During all other periods of time, the contact KC1'' is open. Since the safety transistor Q2 is thereby maintained non-conductive, normal operation of the pulsing transistor Q1 is unaffected.

The introduction of the pulsing circuit 58, including active elements, into the tip lead of the subscriber circuit 10 disturbs the critical balancing that must be maintained between the tip and ring leads. Accordingly, a parallel connected resistor R4 and a diode D1 are connected in the ring lead of the subscriber circuit 10 to compensate for the active elements included in the pulsing circuit 58, i.e., transistor Q1.

The high pass filter circuit 60 is coupled across the power supply terminals 54 and 50 or 52. Included in the filter is a choke L1 and a series of parallel coupled capacitors C2, C3, C4 and C5. As earlier mentioned, the high pass filter circuit 60 serves to provide attenuation of the battery noise created by the operation of the pulsing circuit 58.

The power supply regulator circuit 62 is coupled in series with the battery 56 by being connected between the filter 60 and the terminal 54. As shown, the regulator circuit 62 includes a conventional series connected transistor configuration including a pair of transistors Q3 and Q4, and a pair of biasing resistors R5 and R6. It is understood that any other transistor configuration adapted to provide current limiting may be employed. The current limiting provided by the regulator 62 is useful for short subscriber loops and also serves to prevent saturation of the line coupling transformer 14 and deterioration of audio intelligence signals transmitted between the subscriber facility 42 and the central office 44.

As earlier mentioned, the present invention is adapted to be employed for either "long lines" or with lines of normal or shorter length. As an example, long line operation may involve up to 1,500 ohms of central office line and 2,150 ohms of subscriber's lines. Tandem employment of the adapter circuits may involve a midsection line of up to 3,200 ohms. When such high resistances are involved, the current limiting provided by the regulator 62 is unnecessary. Accordingly, the regulator 62 may be short circuited by being strapped across the points labelled A and B and thereby be operatively eliminated from the subscriber loop circuit 10.

Long line operation may be further accomodated by the employment of a positive 48 volt battery in addition to the standard negative 48 volt battery to provide a total of 96 volts to the subscriber loop. This would require that the tip lead terminal 67 be coupled to the +48 volt terminal 50 instead of the + GND terminal 52 of the terminal board 25. It has been found that a pair of series connected lamps 83 or the like may be used as current limiting devices, when necessary, in making the desired use of the positive 48 volt power supply.

The ringing detector circuit 68 includes a full wave diode bridge rectifier 84 including a series of diodes D2, D3, D4 and D5 configured to have a pair of input terminals 85 and 86 and a pair of output terminals 88 and 90. The input terminal 85, as shown, is connected through the primary coil 16 to the CO tip lead 72 while the output terminal 86 is coupled through the primary coil 18 to the central office ring lead 74. A relay coil KR1 of a conventional ringing type relay is coupled across the output terminals 88 and 90 and controls the operation of the relay contacts KC1, KC1' and KC1''. A capacitor C6 is coupled in parallel with the relay coil KR1 of the ringing relay for the purpose of providing transient damping to prevent false operation of the ringing relay as a result of, for example, induced high alternating current voltages appearing on the CO lines 38 and 40. A capacitor C7 coupled in series between the bridge input terminal 85 and the primary coil 16 serves to effectively block the flow of direct current through the rectifier 84.

The switching circuit 70 is coupled between the primary coils 16 and 18 and in parallel with the full wave rectifier 84 to effectively complete a central office loop. Included in the switching circuit 70 is a relay contact KC2 coupled in series with a resistor R7. The relay contact KC2 may be of the conventional mercury wetted type and is shunted by a capacitor C8 which provides arc suppression for the relay contact KC2. The resistor R7, which serves to current limit the CO line, is shunted by a capacitor C9 which provides an audio or speech by-pass for the resistor R7. In the case of exteremely long line operation both the capacitor C9 and the resistor R7 may be eliminated from the circuit by being short circuited. This may be accomplished by attaching a "U" link 91 between a set of terminals 92 and 94 of a patchboard 96. For normal or shorter range operation the "U" link 91 may be disconnected or stored by being coupled between the terminals 94 and 97 to effectively retain the resistor R7 and the capacitor C9 in the switching circuit 70.

The ring trip relay circuit 80 includes a relay coil KR3 of a conventional ring trip reed type relay. The relay coil KR3 is shunted by a large capacitance represented by the parallel coupled capacitors C10 and C11. These capacitors C10 and C11 serve to provide a low impedance path for alternating current such that the relay KR3 will only respond to the application of direct current. As shown, the ring trip relay circuit 80 is coupled in series between the patchboard 78 and the relay contact KC1′ such that a reversal in the position oF the relay contact KC1′ will serve to connect the ring trip relay circuit 80 to the subscriber ring lead 66. Generally the ring trip relay circuit 80 operates during a ringing period to discontinue the further application of AC ringing current to a subscriber subset 42 upon the receiver thereof being converted to an off-hook condition. When necessary, the relay coil KR3 may be short circuited by employing any appropriate means such as a "U" link.

The out-pulsing relay circuit 82 serves to control the opening and closing of the relay contact KC2, included in the switching circuit 70. This is accomplished by energizing a relay coil KR2. Direct current is applied to the relay coil KR2 by a transistor Q5 which is adapted to be base driven through either a resistor R9 by the closure of a relay contact KC3 or a resistor R10 by the application of current thereto from the transistor Q1 in the pulsing circuit 58. Operation of the relay contact KC3 is controlled by the relay coil KR3 included in the ring trip relay circuit 80.

A capacitor C12 may be coupled between the collector and the base of the transistor Q5 for the purpose of providing pulse correction when the long line adapter is operating into a standard "A" relay of the central office 44. On extra long distance operation, it has been found that optimal pulsing of less than 1 percent distortion may be obtained by eliminating the capacitor C12. This may be accomplished by removing the "U" link 98 for the purpose of disconnecting the capacitor C12. A check lamp 100 may be included in the out-pulsing relay circuit 82 by being connected in parallel with the relay coil KR2. A momentary switch 102 may be used to energize the check lamp 100.

A pair of diodes D6 and D7 are used to shunt the transformer secondary coils 20 and 22, respectively. These diodes D6 and D7 serve to suppress transient voltages and thereby prevent false operation of the ring trip relay, including the relay coil KR3, upon the operation of the ringing relay included in the ringing detector circuit 68. A capacitor C13 provides termination and speech by-pass between the secondary coils 20 and 22. Otherwise stated, the capacitor C13 provides a low impedance path for AC audio or voice intelligence signals between the coils 20 and 22 while at the same time providing a high impedance path for direct current signals.

Briefly summarizing the operative relationship of the relays included in a long line adapter circuit, in accordance with the present invention, the relay coil KR1, included in the ringing detector circuit 68, is associated with the relay contacts KC1, KC1′ and KC1″. The relay coil KR2, included in the outpulsing relay circuit 82, is associated with the relay contact KC2 included in the switching circuit 70. The relay coil KR3, included in the ring trip relay circuit 80 is associated with the relay contact KC3 included in the out-pulsing circuit 82.

By way of example, but not in a limiting sense, elements having the below enumerated types or values may be used in a long line adapter circuit, in accordance with the present invention.

| | |
|---|---|
| Capacitors C1, C2, C3, C4, C5 | 40 microfarads |
| Capacitors C6, C7 | 2 microfarads |
| Capacitor C8 | 0.01 microfarads |
| Capacitor C9 | 15 microfarads |
| Capacitors C10, C11 | 500 microfarads |
| Capacitor C12 | 0.0015 microfarads |
| Capacitor C13 | 10 microfarads |
| Resistor R1 | 10 ohms |
| Resistor R2 | 39.2 ohms |
| Resistor R3 | 1 megaohm |
| Resistor R4 | 30 ohms |
| Resistor R5 | 3.3 kiloohms |
| Resistor R6 | 22.6 ohms |
| Resistor R7 | 600 ohms |
| Resistor R8 | 3 kiloohms |
| Resistor R9 | 75 kiloohms |
| Transistor Q1 | type 2N4888 |
| Transistor Q2 | type 2N5184 |
| Transistor Q3 | type 40412V1 |
| Transistors Q4, Q5 | type 2N 3568 |
| Ringing Relay (KR1, KC1) | ringing type |
| Out-pulsing Relay (KR2, KC2) | mercury wetted reed type |
| Ring Trip Relay (KR3, KC3) | ring trip reed type |

Considering the operation of the present invention in greater detail, standard AC ringing current will be applied from the central office 44 to the CO tip and ring leads 72 and 74 when the subscriber subset 42 is being called. The AC ringing current will be applied through the primary coils 16 and 18 to the input terminals 85 and 86 of the diode bridge rectifier 84. The resulting DC current developed across the rectifier output terminals 88 and 90 will be applied to the relay coil KR1 of the ringing relay and thereby cause the relay contacts KC1, KC1′ and KC1″ to reverse their positions during the ringing periods. The AC ringing current is thereby applied to the bell, or ringer, of the subscriber subset 42 through the subscriber tip and ring leads 64 and 66. Safety transistor Q2 is energized by closure of contact KC1″ and operates to prevent false operation of the pulsing circuit 58. Upon the answering of the ringing produced at the subscriber subset 42 by the receiver thereof being converted to an off-hook condition, the subscriber loop is closed. Whenever this occurs during a ringing period, the ring trip relay circuit 80 will be serially coupled to the subscriber ring lead 66 through the relay contact KC1′. The earlier mentioned standard background direct current mixed with the AC ringing current will serve to energize the relay coil KR3 to produce the closure of the relay contact KC3 in the out-pulsing relay circuit 82. This closure of the relay contact KC3 will trigger the drive transistor Q5 to produce the energization of the relay coil KR2 and result in the closure of the relay contact KC2 in the switching circuit 70. This closure of the relay contact KC2 effectively discontinues the application of AC ringing signals to the subscriber subset 42 by short circuiting the ringing detector circuit 68 and thereby permitting the relay contacts KC1, KC1′ and KC1″ to revert to their normal positions. Closure of the relay contact KC2, also serves to complete the central office loop and thereby enable the normal transmission of audio or voice intelligence between the subscriber subset 42 and the central office (linking a calling party) to take place.

During the silent periods, between the standard ringing periods, further ringing of the subscriber subset 42 is prevented by energization of the pulsing circuit 58 upon the subset receiver being taken off the hook. This off-hook condition effects closure of the subscriber loop and DC current is provided from the battery 56 to render the pulsing transistor Q1 conductive. The safety transistor Q2 is maintained non-conductive by the open relay contact KC1''. Conduction of the pulsing transistor Q1 produces energization of the out-pulsing transistor Q5. The resulting energization of the relay coil KR2 serves to close the relay contact KC2 in the switching circuit 70, to thereby complete the central office loop, and simultaneously, short circuit or shunt the ringing detector circuit 68. Further application of AC ringing current to the subscriber subset 42 is thus prevented by the relay contacts KC1 and KC1' remaining in their normal positions.

In some instances, it may be desirable to operate in a repeated or regenerative ringing mode wherein repeated or reconstituted ringing signals are provided at the central office 44 by a standard ringing generator. To this end, a pair of ringing generator leads 106 and 108 are connected between the terminal board 24 and the respective patchboards 76 and 78. Repeated ringing may then be accommodated by having a "U" link 110 connect the terminals 114 and 116 on the patchboard 76 and a "U" link 118 connect the terminals 120 and 122 on the patchboard 78. Operation of the relay contacts KC1 and KC1' by the ringing relay coil KR1 will then connect the subscriber tip and ring leads 64 and 66 to the ringing generator leads 106 and 108 respectively. As is customary, the repeated or reconstituted AC ringing current will also include a background DC current. Converting the receiver of the subset 42 to an off-hook condition during a ringing period will therefore energize the ring trip relay coil KR3 in the manner earlier described.

When the subscriber subset 42 belongs to a calling party, a receiver off-hook condition renders the pulsing transistor Q1 conductive in the same manner earlier described for silent periods. The out-pulsing relay coil KR2 is accordingly energized by the out-pulsing transistor Q5 being rendered conductive. The consequent closure of the relay contact KC2 completes thd central office loop and line seizure occurs in the conventional manner at the central office 44. Dialing at the subscriber subset 42 operates to open and close the subscriber loop which causes the pulsing circuit 58 to be pulsed due to the periodic application of DC current to the tansistor Q1. The resulting pulsed operation of the transistor Q5 causes the out-pulsing relay coil KR2 and the relay contact KC2 to be pulsed. The dialing signals are thus transmitted to the central office 44 in the form of pulses corresponding to the opening and closing of the respective central office and subscriber loops.

In order that the customary testing of telephone equipment be extended to the long line adapter circuit, a series of test points are provided to facilitate the testing of the present invention. Specifically, a pair of central office loop test points 124 and 126 are provided for the central office loop circuit 12 and a pair of subscriber loop test points 128 and 130 are provided for the subscriber loop circuit 10. Conventional test apparatus, well-known in the prior art, may be employed to test the respective central office and subscriber loops.

Figure 3:
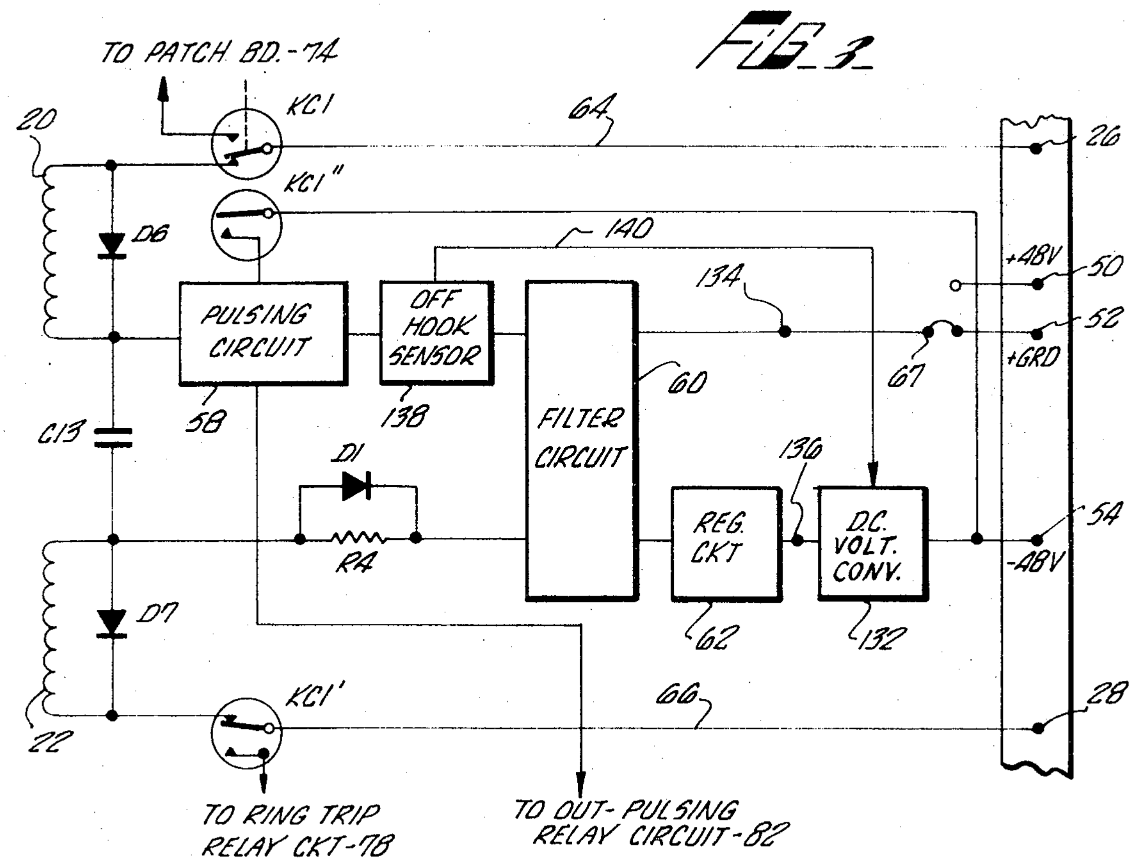
FIG. 3 is a general schematic block diagram illustrating a subscriber loop circuit that has been modified in accordance with the present invention to include an inverter circuit and an off-hook sensing circuit.

Referring now to FIG. 3, the long line adapter circuit of the present invention may be modified to be capable of internally providing an increased line voltage, that is, an additional positive 48 volts, while employing a standard 48 volt battery as the external power supply. Such modification involves the inclusion of a direct current voltage converter or booster circuit to effectively increase, for example, by doubling, the voltage applied to the subscriber loop. Accordingly, D.C. to D.C. voltage converter circuit 132 is coupled across the power source terminals 52 and 54 such that when a 48 volt battery, for example, is the power source, the desired additional positive volts will be developed by the voltage converter to provide a total of 96 volts across the nodes 134 and 136.

Any circuit configuration well-known in the prior art may be employed as the D.C. to D.C. voltage converter circuit 132. Accordingly, no specific circuitry is herein disclosed or discussed in detail.

In the use of D.C. to D.C. voltage converter circuit to effectively boost the subscriber loop voltages, it is desirable that the increased voltages be applied to the subscriber lines only during use. To this end, the present invention includes an off-hook sensing circuit 138 that serves to activate the circuit 132 upon the receiver of subset 42 being put in an off-hook condition. A lead 140 from the sensing circuit 138 serves to provide activating signals to the circuit 132.

Figure 4:
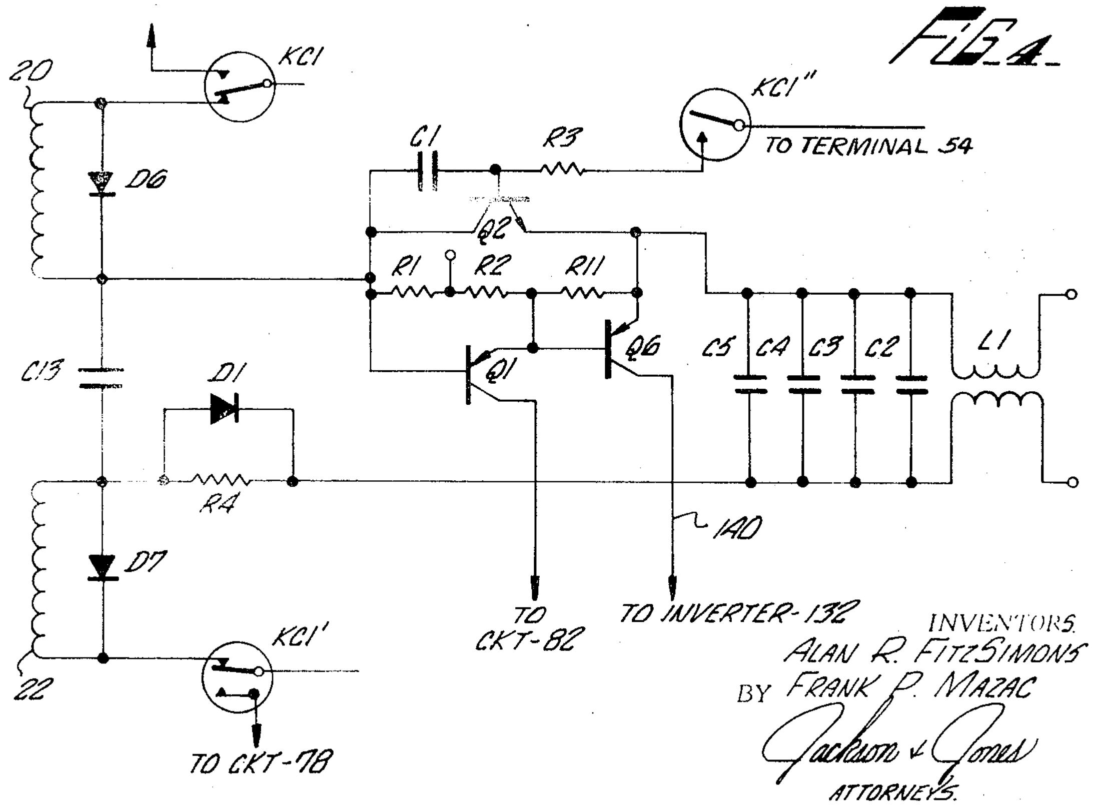
FIG. 4 is a detailed schematic circuit diagram illustrating an off-hook sensing circuit operatively connected in a subscriber loop circuit.

As shown in the schematic diagram of FIG. 4, the sensing circuit 138 essentially comprises a transistor Q6 having a biasing resistor R11 coupled between the emitter and base leads thereof. The combination of the transistor Q6 and resistor R11 are connected into the subscriber circuit 10 by being serially interposed between the pulsing circuit 58 and the filter circuit 60. This may simply require that the base of the transistor Q6 be coupled to the emitter of the pulsing transistor Q1 and the emitter of the transistor Q6 be coupled to the filter circuit 60. Starting signals are applied to the circuit 132 from the collector lead of the transistor Q6 over the lead 140.

As shown by FIG. 4, the false activation of sensing circuit 138 by the false energization of the transistor Q6 can be prevented by extending the operation of the safety transistor Q2 to cover the pulsing circuit 58 as well as the sensing circuit 138. This is simply accomplished by having the safety transistor Q2 coupled to provide a shunting short circuit for the pulsing transistor Q1 as well as the sensing transistor Q6.

From the foregoing detailed discussion, it is now clear that the present invention provides an improved long line adapter circuit that can be used to provide increased loop voltages either by accommodating a larger than standard power supply or by internally developing the desired increased loop voltages. By using the present invention, the effective range of "signaling" over telephone lines can be extended. It is understood that although specific circuit elements are discussed, that the equivalents thereof may be employed to fabricate the invention as by the use of NPN transistors for PNP transistors or vice versa. Further, while negative 48 volt and positive 48 volt power supplies have been specifically discussed, it is understood that the present invention may be used with other power supply requirements as well.

Preferred embodiments of the present invention have been described hereinabove. However, it is intended that all matter contained in the above description and shown in the accompanying drawings, be interpreted as illustrative, and not in a limiting sense, and that all modifications, constructions and arrangements which fall within the scope and spirit of the present invention may be made.

What is claimed is:

1. A long line adapter circuit for connecting a telephone central office to a subscriber subset to compensate for any extraordinary combined length of a subscriber loop and a central office loop, said subscriber subset being of the type having a receiver that is maintainable in an on-hook condition or an off-hook condition, said subscriber loop being adapted to be opened and closed by operation of the subset, said telephone central office equipped to transmit ringing signals, said adapter circuit comprising:

a central office loop circuit adapted to be connected to a telephone central office by a central office loop and including switching means for being connected to said central office loop to effectively open and close said central office loop;

a subscriber loop circuit adapted to be connected to a telephone subscriber subset by a subscriber loop and to a source of direct current power, said subscriber loop circuit including:

pulsing means, connected in said subscriber loop, for providing a control signal when the subscriber loop is closed by operation of said subset, said control signal effecting operation of said switching means to close said central office loop;

voltage increasing means, adapted to be operatively connected to any direct current power supply that is coupled to said subscriber loop circuit, for increasing by a predetermined amount the voltage applied to said subscriber loop circuit and said subscriber loop;

sensing means for providing an off-hook signal in response to said receiver being in an off-hook condition, said off-hook signal being applied to said voltage increasing means to enable the operation thereof for the duration of any off-hook signal;

safety means, connected to said pulsing means and said sensing means, for simultaneously preventing false operation of said pulsing means and said sensing means by the transmission of said ringing signals by shunting said pulsing means and said sensing means which are connected in series; and means for inductively coupling said central office loop circuit and said subscriber loop circuit.

2. The apparatus defined by claim 1 wherein said central office loop circuit includes ringing detector means for detecting ringing signals transmitted from said telephone central office and for enabling said ringing signals to be applied to said subscriber subset, said safety means being operatively controlled by said ringing detector means to operate in response to the detection of ringing signals by said ringing detector means.

3. The apparatus defined by claim 1 wherein said subscriber loop circuit includes a tip lead and a ring lead which are each adapted to be effectively connected to said subscriber subset by said subscriber loop and to a direct current power supply, said pulsing means including a first transistor coupled in said tip lead to be rendered conductive in response to said subscriber loop being closed by operation of said subset.

4. The apparatus defined by claim 3 wherein said safety means comprises a second transistor connected to shunt said first transistor, said first transistor being short circuited in response to said second transistor being rendered conductive.

5. The apparatus defined by claim 2 wherein said subscriber loop circuit includes a tip lead and a ring lead which are each adapted to be effectively connected to said subscriber subset by said subscriber loop and to a direct current power supply, said pulsing means including a first transistor coupled in said tip lead to be rendered conductive in response to said subscriber loop being closed by operation of said subset.

6. The apparatus defined by claim 5 wherein said safety means comprises a second transistor connected to shunt said first transistor, said first transistor being short circuited in response to said second transistor being rendered conductive.

7. The apparatus defined by claim 6, said sensing means comprising a third transistor serially connected with said first transistor such that said first and third transistors are both responsive to said subscriber loop being closed, said first and third transistors both being short circuited by said second transistor being rendered conductive.

8. A long line adapter circuit for being connected between a telephone central office and a telephone to compensate for undesired attenuation of signals by the extraordinary length of the telephone loop formed by the tip and ring telephone lines connecting the telephone to the central office, said telephone having a receiver adapted for an on-hook condition or an off-hook condition, said central office being adapted for sending ringing signals, said long line adapter circuit including:

a pair of transformers interposed between said central office and said telephone by being connected in said tip and ring telephone lines, said transformers each having primary and secondary coils, the primary coils of said transformers connected in series between the tip and ring telephone lines connected to the central office to form a central office loop, the secondary coils connected in series between the tip and ring telephone lines connected to the telephone to form a subscriber loop, said central office loop being inductively coupled to said subscriber loop by said transformers;

a central office loop circuit connected between said primary coils, said central office loop circuit including switching means for selectively opening or closing a resistive path between said primary coils; and a subscriber loop circuit connected to said secondary coils, said subscriber loop circuit including:

pulsing means for providing a control signal when said receiver is in an off-hook condition, said control signal effecting operation of said switching means to close said resistive path between said primary coils;

a pair of terminals for being connected to a source of direct current power; voltage booster means for increasing by a predetermined amount the voltage applied to said subscriber loop circuit by any source of direct control power connected to said pair of terminals;

sensing means for providing an off-hook signal when said receiver is in an off-hook condition, said off-hook signal being applied to said voltage booster means to enable operation thereof for the duration of said off-hook signal, wherein said pulsing means, said sensing means, said pair of terminals and said inverter means are effectively connected in series between said secondary coils.

9. The long line adapter circuit defined by claim 8 further including:

contact means for selectively completing direct electrical connections of the tip and ring telephone lines between said central office and said telephone, said direct electrical connections effectively by-passing said transformers; and ringing detector means for detecting ringing signals transmitted from said central office to signal said telephone, said ringing detector means connected in parallel to said switching means, said ringing detector means being shunted when said switching means is operated to close said resistive path between said primary coils.

10. The long line adapter circuit defined by claim 9 further including:

safety means, responsive to operation of said ringing detector means by the reception of ringing signals, for preventing false operation of said pulsing means and said sensing means.

* * * * *